Figure 1:
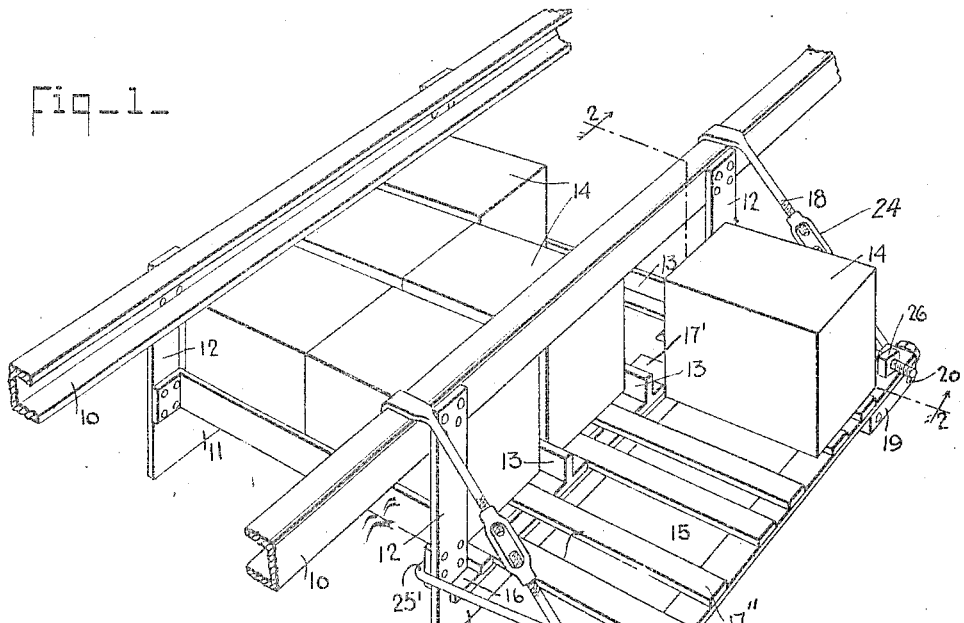

M. KOENIG.
PORTABLE BATTERY SUPPORT.
APPLICATION FILED DEC. 14, 1912.

1,068,250.

Patented July 22, 1913.

WITNESSES
Frank C. Palmer.
Geo. L. Beele

INVENTOR
MATHEW KOENIG,
BY Munn & Co.
ATTORNEYS

UNITED STATES PATENT OFFICE.

MATHEW KOENIG, OF NEW YORK, N. Y.

PORTABLE BATTERY-SUPPORT.

1,068,250.   Specification of Letters Patent.   Patented July 22, 1913.

Application filed December 14, 1912. Serial No. 736,767.

*To all whom it may concern:*

Be it known that I, MATHEW KOENIG, a citizen of the United States, and a resident of the city of New York, Long Island City, borough of Queens, in the county of Queens and State of New York, have invented a new and Improved Portable Battery-Support, of which the following is a full, clear, and exact description.

This invention relates to temporary supports and has particular reference to a means for manipulating storage batteries, though I do not wish to be limited to any such particular use.

Among the objects of the invention is to provide a support to be temporarily applied to the frame of a chassis of an electric automobile, whereby the several batteries may be withdrawn from their normal support for inspection or repair and then easily replaced whereby the difficulty usually experienced in removing the batteries from the chassis upon trucks or otherwise for conveyance to a distant point is overcome.

A further object of the invention is to provide a device of the character indicated which will not only be easily applied to or removed from the fixed support, but will be strong and reliable in use and of the maximum strength in proportion to its weight.

The foregoing and other objects of the invention will hereinafter be more fully described and claimed and illustrated in the drawings forming a part of this specification in which like characters of reference indicate corresponding parts in both the views, and in which—

Figure 2:
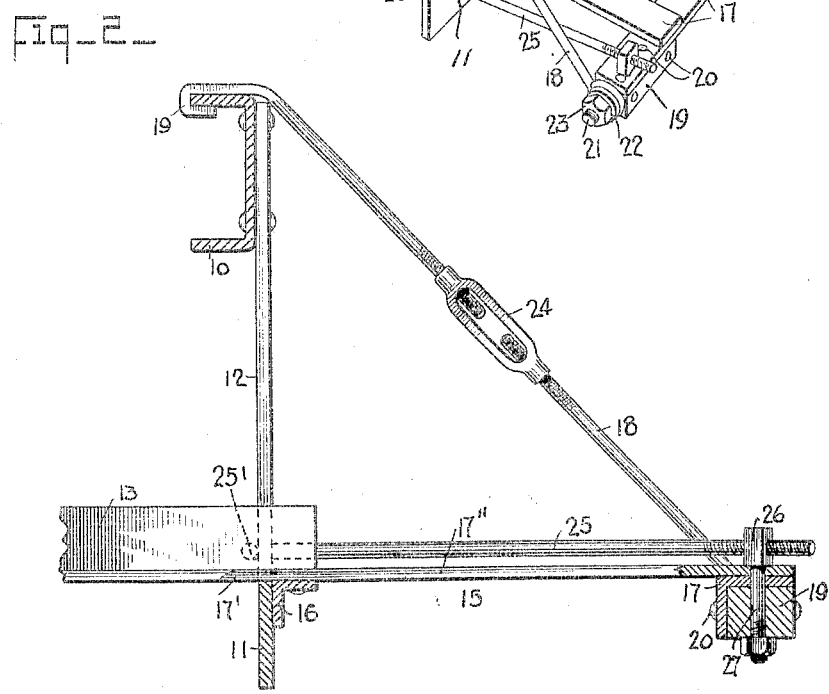

Figure 1 is a perspective view of a fragment of a chassis showing the invention applied thereto and with one of the batteries supported thereon, the batteries being indicated diagrammatically; and Fig. 2 is a transverse vertical section substantially on the line 2—2 of Fig. 1.

The several parts of this device may be made of any suitable materials, and the relative sizes and proportions thereof may be varied to a considerable extent without departing from the spirit of the invention as hereinafter fully set forth and claimed.

The numeral 10 will be understood to indicate the main beams or members of a chassis frame of any conventional type, and the numeral 11 shows an auxiliary member or bar suspended from each of the beams 10 by means of hangers 12. Any suitable number of transverse angle bars 13 will be used to connect the bars 11 and serve as normal supports for the several batteries 14. The foregoing parts are or may be of any well known design or construction.

The device constituting the subject matter of this invention comprises, in a preferred embodiment, a platform 15 comprising a pair of rails 16 and 17 connected and maintained in parallel relation to each other by a series of plates 17″. The rail 16 is adapted to lie snugly against the outer face of the bar 11 and the inner ends 17′ of the plates 17″ are adapted to extend inwardly over the upper edge of said bar 11 between the angle bars 13 of the main frame. Said plates 17″, furthermore, are preferably substantially of the same thickness as the angle bars 13, whereby the batteries may be moved in or out with facility.

The platform 15 is maintained in substantially horizontal position in connection with said bar 11 by any suitable means, the means herein shown comprising a pair of hangers 18 each having suitable means such as a hook 19 at one end for convenient and reliable engagement with any suitable part of the main support and having its other end pivotally connected in any convenient manner to the outer rail 17 of the platform. As a preferred means for connecting the hangers 18 to the rail 17, I provide for each hanger a block 19 fitted into the angle of the rail 17 preferably at its end and secured thereto by bolts or rivets 20 passing through the block 19 and both flanges of the rail 17. The outer end of each block is provided with a trunnion 21 upon which the lower end of the adjacent hanger is pivotally mounted and secured by means of a washer 22 and nut 23. In order to accommodate the support to various sizes or designs of chassis, the hangers are preferably adjustable as to length by a well known form of turn buckle 24.

The platform 15 is prevented from inward displacement by its contact with the bar 11. Downward sagging of the platform is prevented by the hangers 18. Outward displacement of the platform is prevented, as herein shown, by means of a pair of anchor arms 25 connected to the platform in any suitable manner and having hooks 25′ adapted to engage with the main frame. I prefer to arrange these arms 25 so that they will swing on vertical pivots in planes parallel to the platform 15. As herein shown, each arm 25 has threaded connection with the head 26 of a bolt 27 journaled in the end of the rail 17 and block 19. The bolt 27 constitutes a pivot for the arm, and the threaded connection between it and the head 26 provides for any necessary adjustment as to the length of the arm. When the arm is swung so that the arm 25' is disengaged from the main frame, the length of the arm may be adjusted as necessary, but when the hook is in engagement with the frame no unintentional adjustment of the arm can take place. The connection of the bolt 27 with the rail through the block 19 provides an exceedingly strong and reliable construction.

With the parts arranged and adjusted as shown in the drawings, the platform 15 has positive and rigid connection with the main frame and is not affected in any manner by the movement of the batteries in either direction. The batteries, therefore, may be drawn out upon such platform for any necessary operation to be performed thereon. In order to remove the support from the main frame I have but to swing the arms 25 outward from engagement with the hangers 12 when the platform 15 will be free to be lifted and unhooked from the beam 10 or other part of the frame to which it may be connected.

Having thus described my invention, I claim as new and desire to secure by Letters Patent:—

1. In a device of the character set forth, a platform comprising a pair of parallel rails and a series of plates connecting said rails, the plates at one end extending beyond the adjacent rail, a pair of hangers including attachment means at one end, means to secure the hangers to the platform comprising a pair of blocks having trunnions pivotally connected to the other ends of the hangers, and a pair of arms pivoted to the platform and serving to lock the same to a fixed support.

2. In combination with a main frame, a platform adapted to abut against the side of the frame and having parts projecting thereover, a pair of hangers having means at one end to engage a part of the frame, a pair of blocks connected to a remote portion of the platform and including means pivotally connecting the opposite ends of the hangers, a pair of pivot bolts extending through the platform and said blocks, and a pair of arms adjustably connected to said bolts and movable thereby in planes parallel to the platform, substantially as set forth.

3. In a device of the character set forth, the combination of a platform comprising a pair of angle rails and a series of plates secured to said rails maintaining them in parallel relation, a pair of blocks located at the ends of one of the rails, means passing through both flanges of the rail and said blocks securing the same therein, means to hold up the platform including hangers connected to said blocks, a pair of pivot bolts extending through said blocks and the adjacent rail in a vertical direction, said bolts having screw threaded heads, and a pair of anchor arms adjustably connected to said bolts through said heads, the axis of each arm being at right angles to the axis of the bolt with which it is connected.

In testimony whereof I have signed my name to this specification in the presence of two subscribing witnesses.

MATHEW KOENIG.

Witnesses:
 GEO. L. BEELER,
 JOHN P. DAVIS.